United States Patent [19]

Darre et al.

[11] 3,870,827

[45] Mar. 11, 1975

[54] DIGITAL TIME-DIVISION MULTIPLEX SWITCHING METHOD

[75] Inventors: Allan Darre, Munich; Wolf Springstubbe, Gauting, both of Germany

[73] Assignee: Siemens Aktiengesellschaft, Berlin & Munich, Germany

[22] Filed: Jan. 3, 1974

[21] Appl. No.: 430,570

[30] Foreign Application Priority Data

Dec. 29, 1972 Germany .......................... 2264179

[52] U.S. Cl. .......... 179/15 AP, 325/38 B, 179/15 A

[51] Int. Cl. .......................................... H03k 13/22

[58] Field of Search ........ 179/15 AP, 15 BM, 15 A; 325/38 B; 340/347 DD

[56] References Cited

UNITED STATES PATENTS

| | | | |
|---|---|---|---|
| 3,609,552 | 9/1971 | Limb | 179/15 AP |
| 3,652,957 | 3/1972 | Goodman | 325/38 B |
| 3,707,712 | 12/1972 | Deschenes | 179/15 AP |
| 3,750,144 | 7/1973 | Bolus | 179/15 AP |
| 3,772,678 | 11/1973 | Deschenes | 340/347 DD |

*Primary Examiner*—Ralph D. Blakeslee

[57] ABSTRACT

A method of operation is described for pulse code modulatedd (PCM) time division multiplex exchange switching apparatus for connecting trunks carrying PCM signals to trunks carrying delta modulation information. The delta modulation bits occurring within a predetermined period are combined to form a PCM word, and the bits of this word are written into location in a switching storage in the order of their appearance. This particular group of storage locations is assigned to the delta modulation channel in question. During a period in which no delta modulation bits appear, ,the aforementioned bits are transferred to another group of storage locations.

4 Claims, 2 Drawing Figures

DIGITAL TIME-DIVISION MULTIPLEX SWITCHING METHOD

BACKGROUND OF THE INVENTION

The invention relates to a method of operation of existing pulse code modulation, time division multiplex switching apparatus for connecting trunks carrying delta modulation information with trunks carrying pulse code modulated information.

In telecommunication networks operating in accordance with the time division multiplex principle, interexchange trunks are shared in such a way that signals that are discontinuous in time are transmitted, i.e., signals discontinuous in time, and each pertaining to a given channel, are interleaved in time. An important form of this type of transmission is the digital time division multiplex method wherein the discontinuous signals are digital signals. This is referred to as pulse code modulation (PCM method), wherein at recurring consecutive moments the instantaneous values of the amplitude of the continuous units of information are displayed by means of binary words and transmitted in this form.

Another form of PCM transmission is delta modulation. In this type of modulation, the speech signals are sampled more frequently than in the case of the conventional PCM method. However, in contrast to the latter method, the quantized instantaneous value of the amplitude of the speech signal is not transmitted, but rather the quantized excursion from each preceding quantized instantaneous value of the amplitude. Thus, a determination is made as to whether the amplitude of the speech signal exceeds or falls below the quantized amplitude value determined at the preceding sampling instant. Accordingly, a 1-bit character 1 or 0 is transmitted, which thus indicates to a certain extent the tendency of the speech signal amplitude (rising or falling). At the receiving end, a quantizing asymptotic curve is obtained by integrating the series of transmitted pulses and, finally, from this curve the original analog signal is again recorded. Delta modulation is of particular value for speech transmission, since in this case the disadvantage of relatively high frequencies peculiar to this type of modulation does not have a deleterious effect. Consequently, one can expect a future use of this type of modulation on a larger scale than hitherto has been the case, because a lesser amount of apparatus is required than in the case of the PCM system. Of significance, delta modulation permits the elimination of expensive coders. However, one should expect that for reasons of economy, a commercial use of delta modulation will not result in the discontinuation of existing devices developed in connection with the PCM switching system.

It is known in the art to switch and transmit via PCM devices intelligence other than PCM information (NTF 40, 1971, page 108 ff). By way of example, telegraph signals in PCM telecommunication networks are switched and transmitted in such a way that these signals are sampled at a frequency eight times greater than the clock frequency of the PCM channel, and the eight sampled values thus obtained within a PCM pulse frame are stored and then switched and transmitted as an 8-bit PCM word. Assuming that the telegraph signal is usually transmitted at a rate of 1200 bauds, but that in the PCM system 64,000 bits per second are available for a PCM speech channel, it can readily be seen that this method has a very low utilization coefficient.

A prior art method that brings improvement in this regard (NTF 40, 1971, page 108 ff) is characterized by the fact that the results of the sampling of the telegraph signals are transliterated and interleaved in time in such a manner that each bit of the PCM words transmitted accordingly is allocated to another channel of 8 telegraph channels.

Since, as stated hereinabove, in addition to the PCM modulation the delta modulation can be of importance precisely because of the elimination of the coders, a method corresponding to the last-mentioned prior art method is unsuitable for switching units of delta-modulation information in PCM telecommunication networks.

It is, therefore, an object of the invention to provide a time division switching method for units of delta-modulation information by means of PCM central offices, wherein the use of coders and decoders is not required and wherein the PCM telecommunication network devices can be employed substantially without undergoing any alterations.

SUMMARY OF THE INVENTION

According to this invention, the method is characterized in that the delta-modulation bits of a given channel, occurring during the delta-modulation system periods contained within a PCM system period in an integral plurality equalling at the very most the number of PCM information bits of a PCM word, are combined in a PCM word and passed on therein in such a way that they are introduced to the PCM central office in the order of their appearance. They are written in the first storage locations of a storage row of a switching storage having an identical storage capacity designed in accordance with the possible appearance of PCM information bits in the course of a PCM system period on a PCM interexchange trunk. Each said storage row is allocated individually to the channel in question. Thereafter, in the course of a period during which no units of delta-modulation information are transmitted, they are transferred to the other storage locations of the storage row involved. If, however, the number of delta-modulation system periods contained within a PCM system period exceeds the number of half the information bits of a PCM word, the delta modulation data are transferred to the corresponding row of another switching storage having the same storage capacity for retransmission therefrom as a PCM word or as the portion of a PCM word, whose other portion is without information content.

In a practical example of the method according to the invention, wherein there appear within a PCM system a maximum of four delta-modulation system periods, in a first step the first half of the rows of the switching storage, described above, can be occupied by delta-modulation information, and in a second step this information can be transferred to the second half of the switching storage. In this case, it is not necessary to employ an extra switching storage, even if the storage times exceed one PCM system period.

According to another example of the method according to the invention, there are written in a first or second specific row of the storage eight synchronizing bits, or eight signals bits, in the order of their appearance and occurring within each delta-modulation system period during a first and second time interval corresponding to one PCM time slot each. In this way, allowance is made for a type of switching method wherein the synchronizing bits and signal bits are switched along, which has its advantages in monitoring the transmissions.

BRIEF DESCRIPTION OF THE DRAWINGS

The principles of the invention will be more readily understood by reference to the description of a preferred embodiment given hereinbelow in conjunction with the two figures of drawings.

DETAILED DESCRIPTION OF THE DRAWINGS

Figure 1:
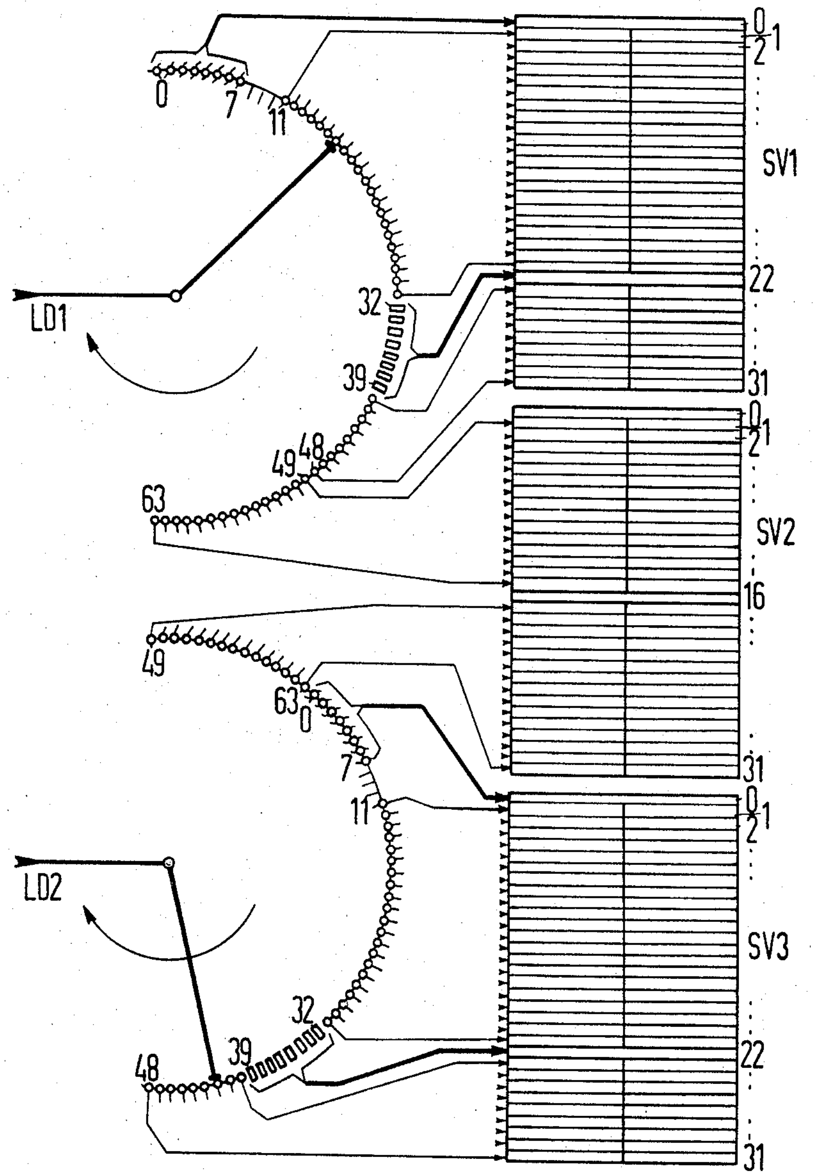
FIG. 1 shows schematically how the information, synchronizing, and signal bits are written from two delta-modulation systems into 3 PCM storages.

The units of delta-modulation information being switched in accordance with the method of the invention are, for example, scanned at a sampling rate four times the PCM channel rate. Therefore, there appear within a PCM pulse frame four sampled values pertaining to one delta-modulation channel. Each of these sampled values appears during a time interval equalling the time interval required for a PCM bit. Thus, within a delta-modulation system period there are 64 bit intervals 8 of which, viz. bit intervals 0–7, are employed for transferring an identifying word. The 3 time intervals 9, 10 and 11 following immediately remain fully unutilized. Another eight bit interval of the delta-modulation system period, viz. the bit intervals 32–39, are utilized for transmitting signals. Since in the case of delta modulation, the individual samples, as stated hereinabove, need not be coded, but through a single pulse or by suppressing the emission thereof during a bit interval it is made evident that the value of the sampled analog signal is greater or smaller than that of the quantized value of each preceding sampling, there remain in this case 45 bit intervals for 45 delta-modulation channels.

In the example explained with reference to FIG. 1, 45 such deltamodulation channels appearing at any given moment on two delta-modulation interexchange trunks are distributed among three storages of a PCM central office. This occurs while the delta-modulation interexchange trunks are being connected to PCM interexchange trunks. These three storages are capable of storing, during a PCM system period, all the bits appearing within such a PCM system period, for which they have 32 rows with eight storage locations each for one bit corresponding to the 32 PCM words within a PCM system period and corresponding to the eight bits within a PCM word. As shown in FIG. 1 by the schematic disposition used to explain the distribution of the units of delta-modulation intelligence, the units of delta-modulation channels 11-32 are sequentially posted to the first storage locations of rows 1-21 of the first storage SV1 of the PCM central office in the order of their appearance. The same is true for the posting of delta-modulation channels 32–48 to storage rows 23–31. The remaining delta-modulation channels 49–63, which are carried over delta-modulation interexchange trunk 9 LD1, are posted to the first storage locations of rows 1–15 of the second storage SV2.

The delta-modulation information bits appearing in delta-modulation channels 11–31 and 40–48 on delta-modulation interexchange trunk LD2 are posted to storage rows 11–31 or 40–48 of the third storage SV3 in the same manner as the units of information of the like-named delta-modulation channels appearing on delta-modulation interexchange trunk LD1. For the remaining delta-modulation information bits delivered on delta-modulation interexchange trunk LD2 and transferred to channels 49–63 there follows an entry into the first storage locations of rows 17–31 of the second storage SV2.

The bits of the identifying word for the delta-modulation system period on delta-modulation interexchange trunk LD1 appearing during time intervals 0–7 are sequentially posted to the first row 0 of the first buffer storage SV1. The same is true of flag bits appearing during the bit intervals 32–39 and posted sequentially to the eight storage locations of row 22 of the first storage SV1.

Figure 2:
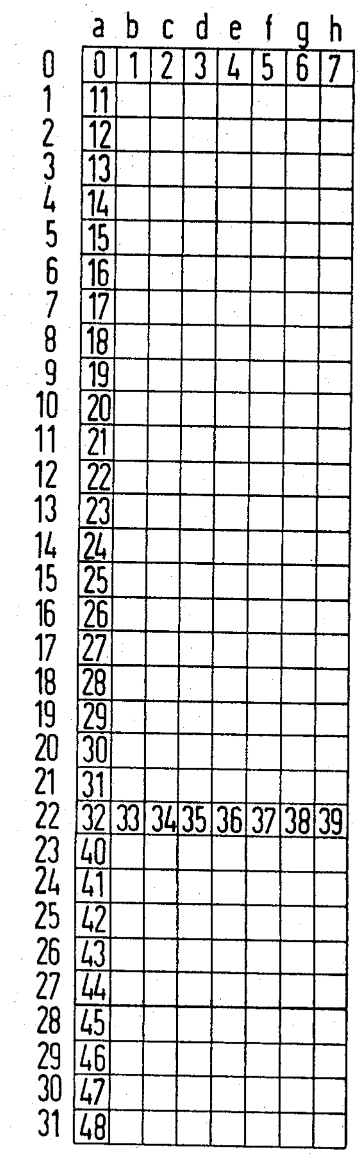
FIG. 2 is an occupancy diagram of one of these storages.

The distribution of information, as explained hereinabove, is depicted in FIG. 2 as an example for the storage SV1. Accordingly, when a deltamodulation system period runs out, all eight storage locations of row 0 are occupied by the bits of the identifying word. In the first storage locations of each of the rows 1–21 are delta-modulation information bits of delta-modulation channels 11–31, but in storage row 22 all eight storage locations are occupied anew, by flag bits transmitted during intervals 32–39 within the delta-modulation system period. The first storage locations of each of the rows 23–31 are again occupied by units of information of delta-modulation channels 40–48.

As shown in FIG. 1, the third storage SV3 is occupied in the same manner as the storage SV1, but no identifying word and no flag bits are written in the second storage SV2, since only two different units of information are transferred for either of the two delta-modulation interexchange trunks LD1 and LD2. Accordingly, in the second storage SV2 the storage rows 0 and 16, which in the two other storages are utilized for the identifying word and for the flag bits remain unoccupied.

During the subsequent delta-modulation system period, the identifying word and the flag bits are again written in rows 0 and 22 of storages SV1 and SV3. Moreover, the storage locations of the remaining rows of the three storages disposed in the column marked *b* in FIG. 2 are occupied by the corresponding units of information of the delta-modulation channel appearing in this subsequent delta-modulation pulse frame. This procedure is repeated four times within a PCM pulse frame, so that upon the expiration thereof all storage locations of columns *a*, *b*, *c*, and *d* are occupied in the individual rows of the storages.

During the first eleven time intervals of the subsequent delta-modulation system periods which, as stated hereinabove, are not utilized for the transfer of units of delta-modulation information, the units of delta-modulation channel intelligence in storage columns *a*, *b*, *c* and *d* are passed on one after another and for all storage rows together to the storage locations of columns *e*, *f*, *g*, and *h*. Thus, the second halves of the individual storage rows are presently filled with four units of delta-modulation channel information, but their first halves are available for receiving further units of delta-modulation information. The units of delta-modulation information in the second halves, together with four dummy bits without any information content, are now processed as PCM words during the further switching operation, utilizing the corresponding PCM central office devices. Therefore, in departure therefrom, the bits of the identifying word and the flag bits which, as stated hereinabove, are again written in the respective storage rows during each delta-modulation period, are, likewise, read out four times in the course of one PCM system period.

At the receiving end, the units of delta-modulation information are again retrieved one after another from PCM storages in a read-out procedure corresponding to the above described write-in procedure in order to be passed on either on a true delta-modulation interexchange trunk or received from a delta-modulation transmitting station.

The principles of the inventive method have been described hereinabove in terms of the operations of a preferred form of apparatus for its execution. It is contemplated that the method of the invention can be applied to other forms of apparatus while remaining within the scope of the invention, as defined by the appended claims.

We claim:

1. A method for operating pulse code modulation (PCM), time division multiplex exchange switching apparatus to connect interexchange trunks carrying delta-modulation information to PCM interexchange trunks, comprising the steps of:

combining bits of delta-modulation information in a given channel, which bits occur during the delta-modulation system periods contained within a PCM system period in an integral number equalling no more than the number of PCM bits in a PCM word, coupling said delta-modulation bits in the order of their appearance in PCM word form to said exchange switching apparatus, writing said delta-modulation bits into first storage locations of a storage row in a first switching storage in said exchange switching apparatus, said storage row being individually assigned to said given channel, transferring said delta-modulation bits in PCM word form for the duration of a period when no further delta-modulation bits appear, to other locations in said assigned storage row and if the number of delta-modulation system periods exceeds the number of half the information bits in a PCM word, transferring said delta-modulation bits to the corresponding row of a second switching storage having an identical storage capacity for retransmission therefrom as at least a portion of a PCM word.

2. The method defined in claim 1 wherein there are at least four delta-modulation periods contained within a PCM system period, wherein said writing step utilizes the first four storage locations of said assigned storage row and wherein said transferring step occurs from said first four storage locations to a second four storage locations in the same storage row.

3. The method defined in claim 2 wherein said writing step includes writing other than information bits into a specific row of said first switching storage in the order of their appearance and occurring within each delta-modulation system period during a first and second time interval corresponding to one PCM word each.

4. The method defined in claim 3 comprising the additional step of:

placing no date in storage during a series of bit intervals immediately following the time intervals for said bits which are other than information bits and during which time intervals no units if information are transferred.

* * * * *